(12) United States Patent
Sukonik et al.

(10) Patent No.: US 9,246,823 B1
(45) Date of Patent: Jan. 26, 2016

(54) REMOTE POLICING IN A CHASSIS SWITCH (71) Applicant: MARVELL ISRAEL (M.I.S.L) LTD., Yokneam (IL)

(72) Inventors: Vitaly Sukonik, Katzir (IL); Mark Dunaevsky, Kfar Saba (IL); Rafi Tamir, Petach-Tikva (IL)

(73) Assignee: MARVELL ISRAEL (M.I.S.L.) LTD., Yokneam (IL)

( * ) Notice: Subject to any disclaimer, the term of this patent is extended or adjusted under 35 U.S.C. 154(b) by 141 days.

(21) Appl. No.: 13/722,249

(22) Filed: Dec. 20, 2012

Related U.S. Application Data (60) Provisional application No. 61/579,620, filed on Dec. 22, 2011, provisional application No. 61/601,277, filed on Feb. 21, 2012.

(51) Int. Cl.
*H04L 12/813* (2013.01)
*H04L 12/26* (2006.01)

(52) U.S. Cl.
CPC ............ *H04L 47/20* (2013.01); *H04L 43/0888* (2013.01)

(58) Field of Classification Search
None
See application file for complete search history.

(56) References Cited

U.S. PATENT DOCUMENTS

| | | | | |
|---|---|---|---|---|
| 6,807,172 | B1* | 10/2004 | Levenson et al. | 370/389 |
| 2006/0023705 | A1* | 2/2006 | Zoranovic et al. | 370/389 |
| 2006/0101159 | A1* | 5/2006 | Yeh et al. | 709/246 |
| 2007/0058632 | A1* | 3/2007 | Back et al. | 370/392 |

* cited by examiner

*Primary Examiner* — Diane Lo (57) ABSTRACT

A distributed network device and method for policing a flow of traffic in the chassis switch in communication networks. The distributed network device incudes a first processor configured to perform an egress processing operation on data packets received from a plurality second processor units in the distributed network switch, the data packets being destined for a receiving device coupled to the distributed network switch. Further, the distributed network device includes a metering unit associated with the first processor, the meting unit configured to meter a flow of the data packets to the receiving device and output a metering result. Also, the distributed network device includes a message generator configured to communicate to the plurality of second processors in the distributed network device a notification message indicative of the metering result.

18 Claims, 5 Drawing Sheets

REMOTE POLICING IN A CHASSIS SWITCH

CROSS-REFERENCE TO RELATED APPLICATION

Priority is claimed from U.S. Provisional Patent Application No. 61/579,620 filed Dec. 22, 2011, and U.S. Provisional Patent Application No. 61/601,277 filed Feb. 21, 2012, the disclosures of all of which are incorporated herein in their entirety by reference.

BACKGROUND

1. Field

The current disclosure relates to data communications, and more particularly, to policing a flow of data traffic in switches in communication networks.

2. Background

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Traffic between a data provider network and a data receiver network is conventionally policed for a Service Level Agreement (SLA) compliance at egress devices in an edge switch that connects the provider network to the receiver network. However, policing at the egress devices results in dropping some data packets that have been significantly processed, for example through ingress and egress devices of a switch fabric.

SUMMARY

One or more embodiments of the disclosure relate to policing a flow of traffic in a switch in communication networks.

According to an embodiment, there is provided a distributed network switch having first processors and second processors. The distributed network switch incudes a first processor configured to perform an egress processing operation on data packets received from a plurality of second processor units in the distributed network switch, the data packets being destined for a receiving device coupled to the distributed network switch. Further, the distributed switch includes a metering unit associated with the first processor, the meting unit configured to meter a flow of the data packets to the receiving device and output a metering result. Also, the distributed switch includes a message generator configured to communicate, to the plurality of second processors in the distributed network switch, a notification message indicative of the metering result.

The distributed network switch includes a policing status determiner associated with one or more of the second processors. The policing status determiner is configured to receive the notification message and to perform a policing operation on packets received at the one or more second processors.

The first processor is an egress processor and one or more of the second processors is an ingress processor.

The policing status determiner may shape a flow of ingress data packets at one or more of the second processors before completing an ingress processing operation, on the ingress data packets, based on the notification message.

The metering unit may use a token bucket approach for metering the data packets.

One or more of the second processors is configured to buffer or to drop at least some data packets, destined to the first processor, before completing an ingress processing operation on the buffered or dropped data packets, based on the notification message.

The first processor may queue the data packets in egress queues or schedule the data packets for transmitting the data packets to the receiving device.

One or more of the second processors may parse a header of the ingress data packets, determine packet destination address, determine characteristics of the ingress data packets, make a packet bridging decision, make a packet forwarding decision, perform a tunnel termination, and apply an ingress processing policy.

According to another embodiment, a method of policing data packets in a distributed network switch includes receiving, at a first processor in a distributed network switch coupled to a network, data packets transmitted from a second processor in the distributed network device, the data packets destined for a receiving device in the network; metering, at the first processor, a flow of the data packets destined to the receiving device; outputting a metering result; and communicating, by the first processor, to the second processor in the distributed network switch, a notification message indicative of the metering result.

The method of policing data packets includes receiving, at the second processor, the notification message and to performing a policing operation on ingress data packets received at the second processor.

The policing operation may include shaping a flow of the ingress data packets at the second processors before completing an ingress processing operation on the ingress data packets based on the notification message.

The metering operation may use a token bucket approach for metering the data packets.

The policing operation may include buffering or dropping at least some data packets destined to the first processor before completing an ingress processing operation on the buffered or dropped data packets based on the notification message.

According to another embodiment, there is provided a distributed network switch having first processors and second processors. The distributed network switch includes a second processor configured to perform an ingress processing operation on data packets received from a transmitting device coupled to the distributed network switch, the second processor being configured to receive a notification message indicative of a metering result of metering a flow data packets at a first processor that is configured to perform an egress processing operation in the distributed network switch. Further, the distributed switch includes a policing unit associated with the second processor, the policing unit being configured to buffer or to drop at least some data packets destined to be processed in the distributed network switch before completing an ingress processing operation, at the second processor, on the buffered or dropped data packets, based on the notification message.

The policing unit may buffer or drop at least some of the data packets destined to be processed in the distributed network switch before completing one or more selected ingress processing operations at the second processor.

The first processor may send the notification message indicative of the metering result to the second processor.

According to another embodiment, a method of policing data packets, in a distributed network switch having first processors and second processors, includes: receiving, at a second processor in a distributed network switch, from a transmitting device coupled to the distributed network switch, a notification message indicative of a metering result of metering a flow data packets at a first processor that is configured to perform an egress processing operation in the distributed network switch; and buffering or dropping at least some data packets destined to be processed in the distributed network switch before completing an ingress processing operation at the second processor on the buffered or dropped data packets based on the notification message.

The buffering or dropping of at least some of the data packets destined to be processed in the distributed network switch may be performed before completion of one or more selected ingress processing operations at the second processor.

The method of policing data packets includes sending, at the first processor, the notification message indicative of the metering result to the second processor.

DETAILED DESCRIPTION

Embodiments will be described below in more detail with reference to the accompanying drawings. The following detailed description is provided to assist the reader in gaining a comprehensive understanding of the methods, apparatuses, and/or systems described herein. Accordingly, various changes, modifications, and equivalents of the systems, apparatuses and/or methods described herein will be suggested to those of ordinary skill in the art. Also, descriptions of well-known functions and constructions may be omitted for increased clarity and conciseness.

The terms used in the description are intended to describe embodiments only, and shall by no means be considered restrictive. Unless clearly used otherwise, expressions in a singular form include a meaning of a plural form. In the present description, an expression such as "comprising" or "including" is intended to designate a characteristic, a number, a step, an operation, an element, a part or combinations thereof, and shall not be construed to preclude any presence or possibility of one or more other characteristics, numbers, steps, operations, elements, parts or combinations thereof.

Figure 1:
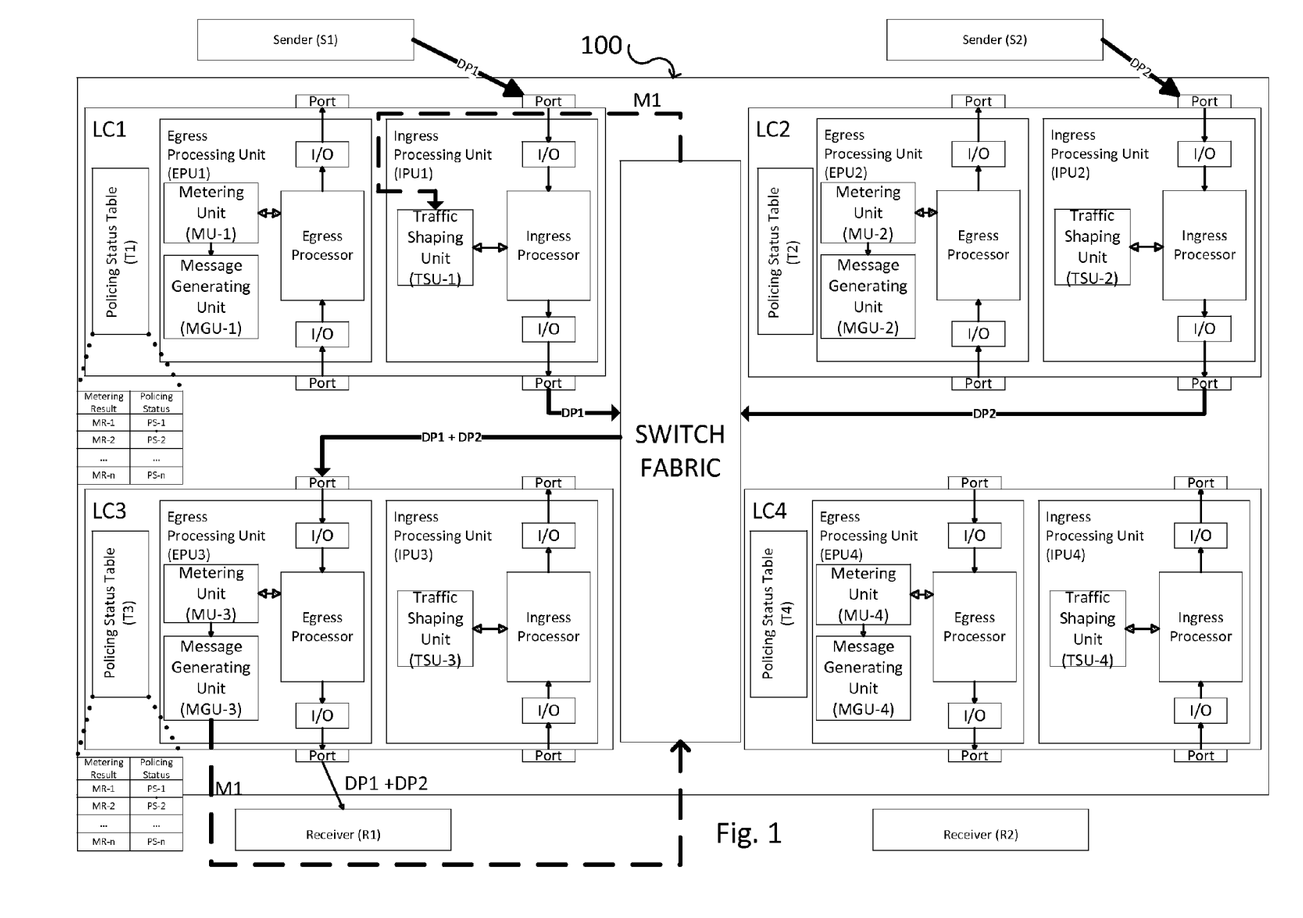
FIG. 1 illustrates a distributed network switch according to an embodiment.

FIG. 1 shows a distributed network switch 100 connecting senders and receivers in a network, according to an embodiment. A communication network typically includes a plurality of senders S1 and S2, a plurality of receivers R1 and R2 and a plurality of network switches, such as distributed network switch 100, interconnecting numerous senders and receivers. In the illustrated embodiment, switch 100 includes processing devices that respectively perform ingress processing, egress processing, and/or both, on packets sent from senders to receivers, with the various processing devices within switch 100 being connected to each other by a switch fabric. In one embodiment, the senders and receivers can be any device capable of transmitting and/or receiving data in the communication network. The senders and receivers can be, e.g., computers, mobile devices, servers, other switches located at various nodes of a network, etc. The distributed network switches or other entities are fabric switches that control and/or facilitate the flow of traffic between senders and receivers, for example.

Sender S1 transmits data packets DP1 to receiver R1 through the network switch 100. For example, the network switch 100 includes a plurality of line cards LC that are configured to transmit packets from senders to receivers through a switch fabric, in an embodiment. In the illustrated embodiment, line card LC1 is communicatively coupled to sender S1 and receives the data packets DP1 through an ingress port connecting the sender to the line card. Line card LC1 performs various ingress processing operations on the received data packets DP1 and forwards the received data packets to the receiver R1 through the switch fabric to a second line card LC3 which is configured to perform various egress processing operations on the packet prior to transmitting the data packets to the receiver via an egress port. Also, in an analogous manner, in the illustrated embodiment, sender S2 transmits data packets DP2 to receiver R1 through a port of line card LC2 communicatively coupled with the sender S2, the switch fabric, and line card LC3.

In one embodiment, the line card LC1 (as well as line cards LC2-4) includes an ingress processing unit IPU1, which is configured to perform ingress processing on the received data packets DP1 and to forward the packets through the switch fabric for additional processing. The ingress processing includes, for example, one or more of performing a header parsing operation to extract information from a packet header, determining a packet destination address, determining characteristics of the packet, making a packet bridging decision, making a packet forwarding decision, performing a tunnel termination, applying an ingress processing policy and any other suitable ingress processing operations. Also, the line card LC2 includes an ingress processing unit IPU2, which processes the received data packets DP2 and forwards the packets through the switch fabric for additional processing. After the data packets are passed through the switch fabric, the processed data packets DP1 and DP2 are received by line card LC3 associated with receiver R1.

In the illustrated embodiment, the line card LC3 includes an egress processing unit EPU3, which is configured to receive the processed data packets DP1 and DP2 from the switch fabric and then perform egress processing on the received data packets DP1 and DP2. The egress processing may include, for example, on or more of queuing, scheduling the data packets to be transmitted to the receiver R1 through an egress port and any other suitable egress processing operation.

Although FIG. 1 illustrates a configuration of switch 100 in a distributed network, it is not limited to the specific configuration shown in FIG. 1. For example, the network switch may include any suitable number of line cards, any suitable number of ingress ports and any suitable number of egress ports, with one or more ports being unidirectional or bidirectional in configuration. Also, packets can be received at any of a plurality of ingress ports, with the ingress ports and egress ports being interconnected through the switching fabric so as to suitably facilitate transfer of packets from an ingress port to one or more of the egress ports.

In one embodiment, during or after egress processing of the data packets at EPU3, the egress processing unit meters a flow of the data packets transmitted to the receiver R1. Based on the metering result, the egress processing unit EPU3 generates a metering notification message that is communicated to all other line cards LC1, LC2 and LC4 in the network switch 100 at which packets may be ingressed. The message may be implemented, for example, by a unicast notification to a specific ingress port or by suitable a broadcast or multicast notification to more than a one port. The metering notification message indicates to all other line cards a metering result determined at the egress processor. In the example embodiment seen in FIG. 1, the egress processing unit EPU3 communicates the metering result only to line cards LC1 and LC2 processing data packets destined for the egress processing unit EPU3. In an embodiment, the metering notification message is a control message used by the line cards LC1 and LC2 to shape the flow of ingress data packets DP1 and DP2 before completing an ingress processing operation on the ingress data packets. The control message is suitably implemented using regular datagrams such as an Ethernet Frame, a Proprietary Fabric cell or any other in-band or out-of-band signaling. In an embodiment, line cards LC1-LC4 include logic configured to suitably process, at the line cards, the communicated metering result so as then to police the ingress packets at the ingress processors based on the determined metering result. In an example, policing includes dropping selected ingress packets that exceed a quota of permitted traffic volume, buffering selected ingress packets or otherwise shaping a queue of the ingress packets in order to remain within a quota of permitted traffic volume that is destined for a particular receiver.

According to an embodiment, the switch fabric is not aware of the content of the metering notification message or the control message transmitted from line card LC3 to the other line cards LC1, LC2 and LC4. The metering notification message is communicated over the switch fabric using the fabric protocol of the switch, in an embodiment.

In another embodiment, the egress processing unit EPU3 includes suitable logic that is configured to determine, at the egress processor, a policing status for shaping the flow of data destined to receiver R1 based on the metering result. In an example, the egress processing unit EPU3 in line card LC3 includes a policing status table that is updated with predetermined policing status information.

The policing status may be any one of many possible granularities. For example, policing status table T3 may store a predetermined correlation between metering results MR-1, MR-2, ... MR-n and policing statuses PS-1, PS-2, ..., PS-n, in an embodiment. The policing statuses PS-1, PS-2, ..., PS-n indicate the type of policing or shaping that should be performed at the ingress processing unit IPU1 in line card LC1 or other ingress processing units (IPUs) in other line cards (LCs). For example, policing status PS-1 may indicate that the data packets having a particular characteristic should be dropped at the ingress processing unit IPU1 in line card LC1, and policing status PS-2 may indicate that the data packets having a particular characteristic should be buffered at the ingress processing unit IPU1 in line card LC1. For example, the data packets may be dropped or buffered based on the class of service (CoS) associated with the data packets or the transmission type of the data packets (i.e., drop the data packets if the data packets are to be unicast).

The egress processing unit EPU3 looks up the policing status table T3 using the metering result and obtains the policing status. For instance, the egress processing unit EPU3 uses a metering result MR-1 to obtain a policing status PS-1, and then generates a notification message indicating the policing status PS-1 then communicates the message to the ingress processing unit IPU1 in line card LC1.

In another embodiment, the metering notification message generating unit (MGU-3) stores the policing status in a local policing status storage in the egress processing unit EPU3, and generates the metering notification message M1 only if there is a change in the policing status stored in the local policing status storage. Similar policing status tables and policing status determination logic can be implemented, as a matter of design choice, at the ingress processing unit. Also, the local policing status table can be centrally implemented in the network switch such that egress processing units (EPUs) and ingress processing units (IPUs) of a plurality of line cards (LCs) can share the policing table, in another embodiment.

In an embodiment, the line card LC1 receives the metering notification message M1, which indicates the metering result of a flow of data transmitted at the egress processing unit EPU3 of the line card LC3, from the line card LC3. In this embodiment, the ingress processing unit IPU1 looks up the policing status table T1, similarly to policing status table T3 illustrated above, using the metering result and obtains the policing status. For instance, the ingress processing unit IPU1 uses a metering result MR-1 received in the metering notification message from the egress processing unit EPU3 to obtain a policing status PS-1. The ingress processing unit IPU1 shapes the ingress data packets DP1 received from the sender S1 based on the obtained policing status PS-1. In one embodiment, the ingress processing unit IPU1 shapes the ingress data packets DP1 by buffering or dropping at least some data packets destined to be processed in the distributed network switch before completing one or more ingress processing operations at the ingress processing unit IPU1 on the buffered or dropped data packets, based on the metering notification message M1.

In another embodiment, the metering notification message M1 indicates a policing status for shaping the ingress data packets DP1 received at line card LC1. In one embodiment, the line card LC1 shapes the data packets DP1 received from the sender S1 by buffering or dropping at least some data packets destined to be processed in the distributed network switch before completing one or more ingress processing operations at the ingress processing unit IPU1 on the buffered or dropped data packets, based on the metering notification message M1.

Figure 2:
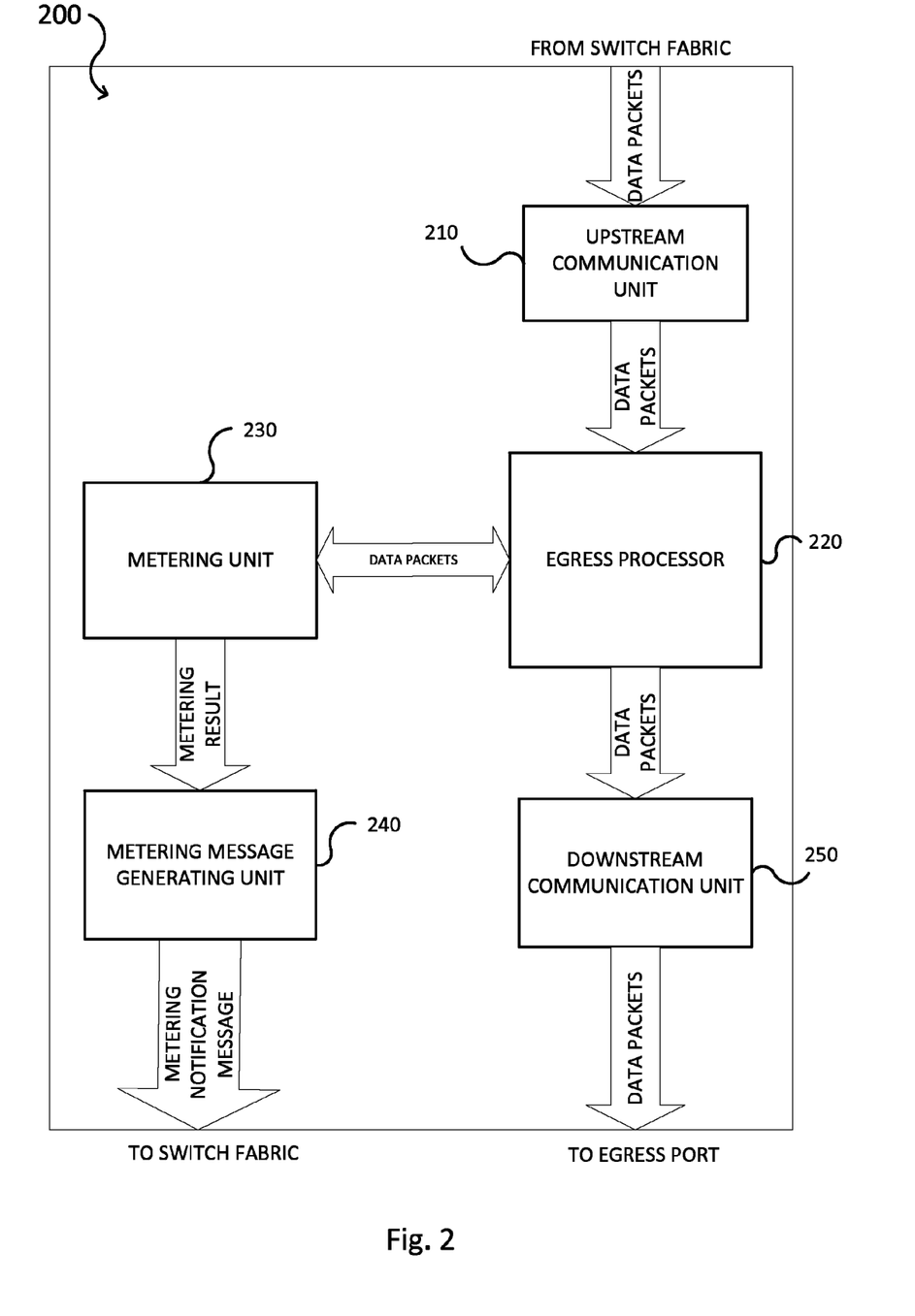
FIG. 2 illustrates an egress processing device in the network switch of FIG. 1 according to an embodiment.

In another embodiment, the line card LC1 receives the metering notification message M1 and updates a global policing status storage at the ingress processing unit IPU1, which stores the respective policing statuses of all egress flows in all the egress processing units in the network switch. Thereafter, the line card LC1 determines a policing status for shaping the flow of data destined to receiver R1 by obtaining the policing status information from the global policing status table. Also, the global policing status table can be centrally implemented in the network switch such that egress processing units (EPUs) and ingress processing units (IPUs) of a plurality of line cards (LCs) can share the policing table, in another embodiment FIG. 2 shows an egress processing unit 200 in a distributed network switch 100, according to an embodiment. The egress processing unit 200 includes an upstream communication unit 210, an egress processor 220, a metering unit 230, a metering message generating unit 240 and a downstream communication unit 250 coupled together in the manner seen in FIG. 2. In an embodiment, the egress processing unit 200 is disposed in the network switch 200, for example as a hardware or software module in a line card that controls and/or facilitates the flow of traffic between senders and receivers on a network. The terms "downstream" communication unit and the "upstream" communication unit have been selected for linguistic convenience only, and are not meant to be limitative. The terms "downstream" and "upstream" refer to where they are located in a processing stream, relative to each other in the network switch.

In an embodiment, the upstream communication unit 210 receives data packets from a switch fabric coupled to one or more ingress processing units in the distributed switch. For example, in an embodiment the upstream communication unit 210 is disposed in line card LC3 and receives data packets DP1 via the switch fabric from ingress processing unit IPU1 disposed in line card LC1. However, the transferring of data packets from an ingress processing unit to an egress processing unit is not limited to transfer of data packets only via fabric switch. The ingress processing unit IPU1 receives data packets DP1 from sender S1, performs ingress processing operation, and forwards the data packets through the switch fabric to the upstream communication unit 210. Similarly, in an embodiment, the upstream communication unit 210 receives, via the switch fabric, data packets DP2 from ingress processing unit IPU2 disposed in line card LC2. The upstream communication unit 210 may be implemented in a tangible sense as I/O ports that are capable of receiving and transmitting data, in an embodiment.

The egress processor 220 receives the data packets DP1 and DP2 and performs one or more egress processing operations on the received data packets DP1 and DP2. The egress processing operation includes scheduling and queuing of the data packets at egress queues to be transmitted to the receiver R1. In one embodiment, the packets DP1 and DP2 are provided to a metering unit 230 associated with the egress processor 220 prior to the performance of the egress processing. In another embodiment, the packets are provided to the metering unit 230 at the same time as the egress processing. In another embodiment, the packets DP1 and DP2 are not provided to the metering unit 230, but, instead, some suitable representation of those packets is provided.

The metering unit 230 meters a flow of data packets, for example to the receiver R2. In other words, the metering unit measures the flow of data packets to the receiver R2, in an embodiment. In one embodiment, the metering unit 230 uses a Token Bucket mechanism for metering the flow of data packets. In a Token Bucket mechanism, a bucket is filled with tokens, each token representing one byte. In order to transmit x bytes of data (i.e., 100 bytes of data), the bucket must contain a minimum of x tokens (i.e., 100 tokens). As the data is transmitted, the tokens in the bucket are depleted. However, the bucket is refilled with tokens at a rate specified by the Service Level Agreement (SLA). Thus, based on the level of tokens remaining in the bucket, the metering unit 230 implementing the token bucket mechanism meters the flow of data packets to the receiver R1, and generates a metering result. The metering result indicates a level of traffic of the flow of data packets to the receiver R1. In another embodiment, other metering mechanisms can also be implemented to meter the flow of data packets.

Upon metering the flow of data packets, the metering unit 230 sends the metering result to a metering message generating unit 240. In the meantime, the downstream communication unit 250 continues to receive the processed data packets DP1 and DP2 from the egress processor 220 and transmits the data packets to the receiver R1. The downstream communication unit 250 may be implemented in a tangible sense as I/O ports that are capable of receiving and transmitting data.

The metering message generating unit 240 generates a metering notification message and communicates the metering notification messages at least to line cards LC1 and LC2. Also, the metering notification message, including either a metering result or a policing status, can be broadcast, in an embodiment. The metering notification message may be a control message used by the line cards LC1 and LC2 to shape the flow of ingress data packets DP1 and DP2 before completing an ingress processing operation on the ingress data packets. The control message can be regular datagrams such as Ethernet Frame, Proprietary Fabric cell or any other in-band or out-of-band signaling, in an embodiment.

In one embodiment, the egress processing unit EPU3 includes a policing status determiner that includes logic configured to determine a policing status for shaping the flow of data destined to receiver R1 based on the metering result from the metering unit 230. Further, the notification messages are generated based on the determined policing status.

For instance, the policing status determiner, using the metering result, looks up a policing status table T3 located in line card LC3 in an embodiment shown in FIG. 1, and obtains the policing status. For instance, the policing status determiner uses a metering result MR-1 to obtain a policing status PS-1, and then generates a notification message including the policing status PS-1 and communicates it to the ingress processing unit IPU1 in line card LC1. In another embodiment, the metering message generating unit 340 stores the policing status in a local policing status storage in the egress processing unit EPU3, and generates the metering notification message only if there is a change in the policing status stored in the local policing status storage. As shown above, the policing status table T3, stores a predetermined correlation between metering results MR-1, MR-2, . . . MR-n and policing statuses PS-1, PS-2, . . . , PS-n, in an embodiment. The policing statuses PS-1, PS-2, . . . , PS-n indicate the type of policing or the policing that should be performed at the ingress processing unit IPU1 in line card LC1.

Similar policing status tables can be implemented, as a matter of design choice, at the egress processing unit EPU3. Also, the policing status table can be centrally implemented in the network switch such that egress processing units (EPUs) and ingress processing units (IPUs) of a plurality of line cards (LCs) can share the policing table, in another embodiment.

Figure 3:
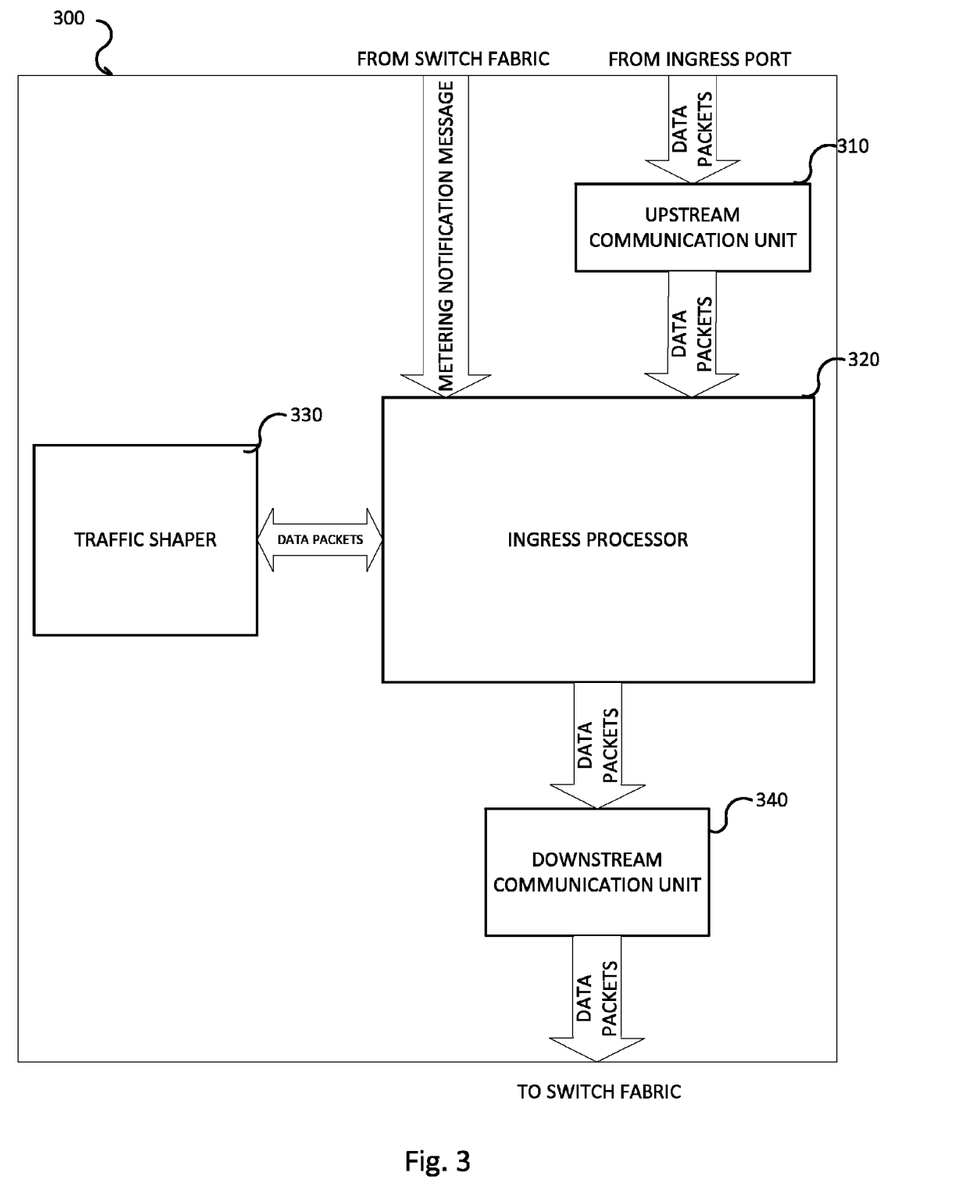
FIG. 3 illustrates an ingress processing device in the network switch of FIG. 1 according to another embodiment.

FIG. 3 shows an ingress processing unit 300 in a communication network according to an embodiment. The ingress processing unit includes an upstream communication unit 310, an ingress processor 320, a traffic shaper 330, and an downstream communication unit 340.

In an embodiment, the upstream communication unit 310 receives data packets DP1 from a sender S1, external to network switch 100, destined for one or more receivers that are also external to network switch 100, and forwards the data packets to an ingress processor 320. The upstream communication unit 310 is implemented in a tangible sense as I/O ports that are capable of receiving and transmitting data, in an embodiment.

The ingress processor 320 receives the data packets DP1 and is configured to perform one or more ingress processing operations such as, but not limited to, performing a header parsing operation to extract information from a packet header, determining a packet destination address, determining a characteristic of a packet, making a packet bridging decision, making a packet forwarding decision, performing a tunnel termination, and applying an ingress processing policy.

According to an example embodiment, the ingress processor 320 receives a metering notification message from an egress processing unit of a line card LC3 associated with the destination receiver R1. In an embodiment, the metering notification message is received through the switch fabric. In one embodiment, the notification message indicates the metering result of a flow of data transmitted at the egress processing unit of line card LC3 to the destination receiver R1. In this embodiment, the ingress processing unit IPU1 includes policing status determiner that includes logic configured to determine a policing status for shaping the flow of data destined to receiver R1 based on the metering result indicated in the metering notification message received from the egress processing unit EPU3.

For instance, the policing status determiner looks up a policing status table T1 located in line card LC1, in an embodiment shown in FIG. 1, using the metering result and obtains the policing status. Similar policing status tables can be implemented, as a matter of design choice, at the ingress processing unit IPU3.

The policing status determiner uses a metering result MR-1 to obtain a policing status PS-1, and forwards the policing status PS-1 and the data packets DP1 to a traffic shaper 330 before completing some or all of the ingress processing operation, in an embodiment. In another embodiment, the traffic shaper 330 receives the metering result and determines the policing status by looking up a policing status table, T1. Alternatively, the notification message can include the policing status already generated at the egress processing unit EPU3 and transmitted to the ingress IPU1.

The traffic shaper 330 shapes the data packets DP1 by buffering or dropping at least some data packets destined to be processed in the distributed network switch before completing an ingress processing operation at the second processor on the buffered or dropped data packets based on the policing status. For instance, the traffic shaper 330 determines how to shape the flow of data packets destined to the receiver R1 based on the policing status indicated in the notification messages, in an embodiment. The policing status may be one of many granularities as seen and described above. In an embodiment, the data packets are dropped or buffered based on a characteristic associated with the data packet. After shaping the data packet traffic, the traffic shaper 330 forwards the remaining data packets to the ingress processor 320 to perform and complete ingress processing. After the ingress processor 320 completes the ingress processing on the shaped data packets, the processed ingress data packets DP1 are forwarded to a downstream communication unit 340.

The downstream communication unit 340 receives the shaped and processed data packets DP1 and forwards the data packets DP1 to the line card associated with the receiver R1 through the switch fabric, in an embodiment. The upstream communication unit 340 is implemented in a tangible sense as I/O ports that are capable of receiving and transmitting data, in an embodiment.

In another embodiment, the ingress processor 320 receives a notification message that indicates either the metering result or the policing status, and updates a global policing status storage at the ingress processing unit IPU1. The global policing status storage stores the respective policing statuses of egress flows in all the egress processing units in the network switch, in an embodiment. Thereafter, the traffic shaper 330 determines a policing status for shaping the flow of data destined to receiver R1 or any other receiver connected to the network switch by obtaining the policing status information from the global policing status table. By implementing a global, or shared, policing status storage, the ingress processing units are aware of the current policing statuses of all the egress flows in the switch. Also, the policing status table can be centrally implemented in the network switch such that egress processing units EPUs and ingress processing units IPUs of a plurality of line cards (LCs) can share the policing table, in another embodiment.

Figure 4:
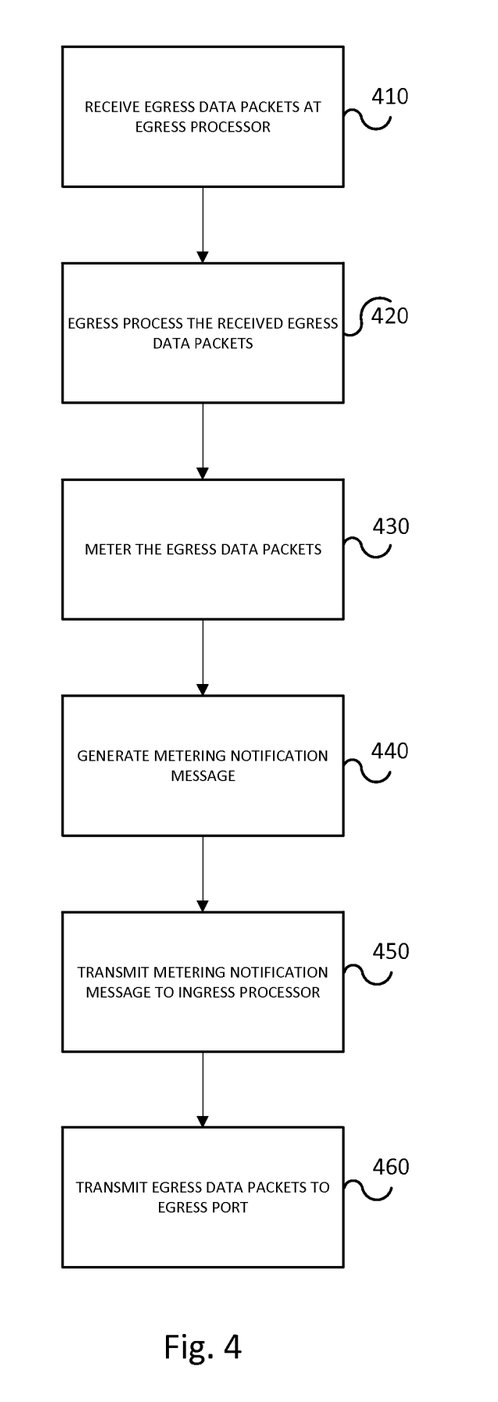
FIG. 4 illustrates a method for metering a traffic flow at an egress according to an embodiment.

FIG. 4 illustrates a method for metering a traffic flow at an egress according to an embodiment.

At 410, the egress processing unit 200 receives data packets DP1 and DP2 from senders S1 and S2, for example from internal ports communicating with a switch fabric that is internal to a distributed network switch. The data packets that are destined for a receiver R1 are received along a first network path. At 420, the egress processor 220 processes the received data packets DP1 and DP2. In one embodiment, the received data packets are scheduled and queued for transmission to the receiver R1.

At 430, a flow of the scheduled and queued data packets DP1 and DP2 is metered, and a metering result is output. In one embodiment, the flow is metered using the Token Bucket mechanism for metering the flow of data packets as described above. Other suitable metering mechanisms can also be implemented to meter the flow of data packets.

At 440, upon metering the flow of data packets, a notification message is generated based on the metering results. In the meantime, the processed and metered data packets are transmitted to the receiver R1. In the meantime, at 450, the data packets DP1 and DP2 are transmitted to the receiver R1 through an egress port.

In one embodiment, the method for managing the traffic flow includes determining a policing status for shaping the flow of data destined to receiver R1 based on the metering result from the metering unit 230. Further, the notification messages are generated based on the determined policing status. The policing status is determined by looking up the policing status table T3 using the metering result and obtaining the policing status, in an embodiment. For instance, the policing determination operation, by a policing logic at the egress processing unit EPU3, includes looking up the policing status table T3 for a metering result MR-1, obtaining a policing status PS-1 associated with the metering result MR-1, and generating a notification message including the policing status PS-1 and communicating to the ingress processing unit IPU1 in line card LC1. In another embodiment, the policing determination operation includes storing the policing status in a local policing status storage in the egress processing unit EPU3, and generating the metering notification message only if there is a change in the policing status stored in the local policing status storage. Also, the policing status table can be centrally implemented in the network switch such that egress processing units EPUs and ingress processing units IPUs of a plurality of line cards LCs can share the policing table, in another embodiment.

Figure 5:
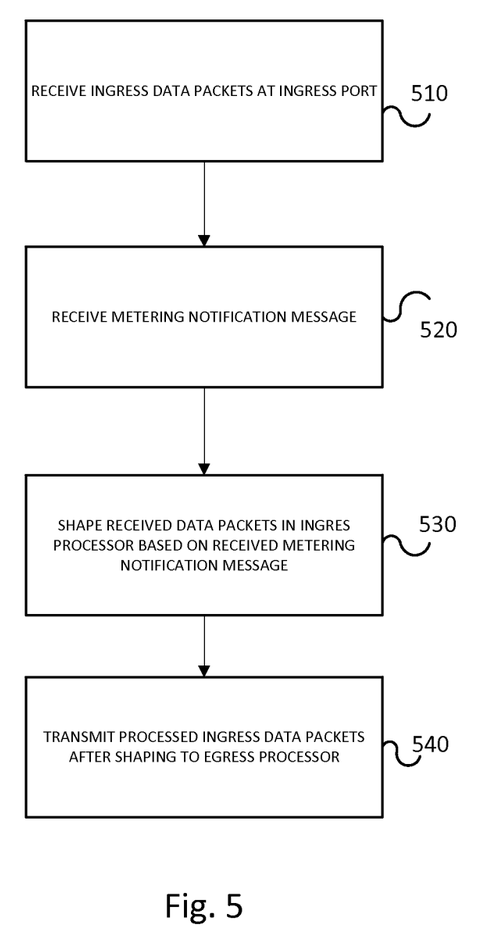
FIG. 5 illustrates a method for policing a traffic flow at an ingress according to an embodiment.

FIG. 5 illustrates a method of policing a traffic flow at an ingress according to an embodiment.

At 510, data packets are received from a sender S1, the data packets being destined for a receiver R1 through the switch fabric of the network switch.

At 520, a notification message is received from an egress processing unit EPU3 of a line card LC3 associated with the destination receiver R1. The notification message indicates the metering result of a flow of data transmitted at the egress processing unit EPU3 of a line card LC3, in an embodiment. The notification message can alternatively indicate a policing status, in another embodiment.

At 530, queues of received data packets are suitably shaped, i.e., buffered and/or dropped as necessary, based on the notification message. In one embodiment, the method includes determining a policing status indicated in the notification messages and buffering or dropping at least some data packets destined to be processed in the distributed network switch based on the policing status. The policing status may be one of many granularities. For example, policing status table T1 located in line card LC1, in an embodiment shown in FIG. 1, stores a predetermined correlation between metering results MR-1, MR-2, . . . MR-n and policing statuses PS-1, PS-2, . . . , PS-n, in an embodiment. The policing statuses PS-1, PS-2, . . . , PS-n indicate the type of policing or policing that should be performed at the ingress processing unit IPU1 in line card LC1.

At 540, the shaped data packets are transmitted to the receiver R1 via the switch fabric.

Although the inventive concept has been described above with respect to the various embodiments, those who are familiar with this field will understand that a variety of permutations and modifications of the described illustrative features may be made without departing from the technical ideas and scope of the embodiments, which shall be defined by the appended claims.

A method of one or more illustrative embodiments may be recorded as computer-readable program codes in transitory or in non-transitory computer-readable media (random access memory (RAM), read-only memory (ROM), and the like). Alternatively, the method can be carried out in one or more modules of dedicated hardware devices, such as a packet processor, or in a suitable programmable processor.

Although the drawings describe the operations in a specific order, one should not interpret that the operations are performed in a specific order as shown in the drawings or successively performed in a continuous order, or all the operations are performed to obtain a desired result. Multitasking or parallel processing may be advantageous under any environment. Also, it should be understood that not all illustrative embodiments do require the distinction of the various system components made in this description.

What is claimed:

1. A distributed network switch, comprising:
   a first processor configured to perform an egress processing operation on data packets received from one or more second processors, in the distributed network switch, the data packets being destined for a receiving device coupled to the distributed network switch, wherein the first processor is configured to perform the egress processing operation after a forwarding decision has been made for the data packets and the one or more second processors is configured to perform at least one or more processing operations before the forwarding decision has been made for the data packets;
   a metering device at the first processor, the metering device configured to meter a quantity of data packets in a flow of the data packets that pass via the metering device in the first processor during a period of time to be received at the receiving device, and to output a metering result; and
   a message generator configured to communicate to the one or more second processors in the distributed network switch a notification message indicative of the metering result.

2. The distributed network switch of claim 1, further comprising:
   a policing status determiner associated with the one or more of the second processors, the policing status determiner configured to receive the notification message and to perform a policing operation on packets received at the one or more second processors.

3. The distributed network switch of claim 2, wherein based on the notification message, the policing status determiner is configured to shape a flow of ingress data packets at the one or more of the second processors by limiting an amount of data packets in the ingress data packets destined to the first processor, before completing an ingress processing operation on the ingress data packets.

4. The distributed network switch of claim 3, wherein the one or more of the second processors is configured to parse a header of the ingress data packets, determine packet destination address, determine characteristics of the ingress data packets, make a packet bridging decision, make a packet forwarding decision, perform a tunnel termination, and apply an ingress processing policy.

5. The distributed network switch of claim 1, wherein the metering device is configured to use a token bucket approach for metering the data packets, the token bucket approach including:
   initially filling a bucket with a plurality of tokens, each token representing a predetermined size of data;
   depleting one token from the bucket each time the predetermined size of data packets pass via the metering device in the first processor; and
   refilling the bucket with additional tokens at a predetermined rate.

6. The distributed network switch of claim 1, wherein, based on the notification message, one or more of the second processors is configured to buffer or to drop at least some data packets destined to the first processor before completing an ingress processing operation on the buffered or dropped data packets.

7. The distributed network switch of claim 1, wherein the first processor is configured to queue the data packets in egress queues or schedule the data packets for transmitting the data packets to the receiving device.

8. A method of policing data packets in a distributed network switch, comprising:
   receiving, at a first processor in a distributed network switch coupled to a network, data packets transmitted from one or more second processors, in the distributed network device, the data packets destined for a receiving device in the network, wherein the first processor is configured to perform an egress processing operation after a forwarding decision has been made for the data packets and the one or more second processors is configured to perform at least one or more processing operations before the forwarding decision has been made for the data packets;
   metering, at the first processor, a quantity of data packets in a flow of the data packets that is destined to the receiving device that pass a metering device in the first processor during a period of time, and outputting a metering result; and
   communicating, by the first processor, to the one or more second processors in the distributed network switch a notification message indicative of the metering result.

9. The method of claim 8, further comprising:
   receiving, at the one or more second processors, the notification message and performing a policing operation on ingress data packets received at the one or more second processors.

10. The method of claim 9, wherein the policing operation comprises:
    based on the notification message, shaping a flow of the ingress data packets at the second processors by limiting an amount of data packets in the ingress data packets destined to the first processor before completing an ingress processing operation on the ingress data packets.

11. The method of claim 8, wherein the metering operation uses a token bucket approach for metering the data packets, the token bucket approach including:

initially filling a bucket with a plurality of tokens, each token representing a predetermined size of data;

depleting one token from the bucket each time the predetermined size of data passes via the metering device in the first processor; and refilling the bucket with additional tokens at a predetermined rate.

12. The method of claim 8, wherein the policing operation comprises:

based on the notification message, buffering or dropping at least some data packets destined to the first processor before completing an ingress processing operation on the buffered or dropped data packets.

13. A distributed network switch, comprising:

an ingress processor configured to perform an ingress processing operation on data packets received from a transmitting device coupled to the distributed network switch, the ingress processor being configured to receive a notification message indicative of a metering result of metering a quantity of data packets in a flow data packets that pass via a metering device in an egress processor during a period of time, the egress processor configured to perform an egress processing operation in the distributed network switch; and a policing device associated with the ingress processor, the policing device being configured to buffer or to drop at least some data packets destined to be processed in the distributed network switch before completing an ingress processing operation at the ingress processor on the buffered or dropped data packets based on the notification message.

14. The distributed network switch of claim 13, wherein the policing device buffers or drops at least some of the data packets destined to be processed in the distributed network switch before completing one or more selected ingress processing operations at the ingress processor.

15. The distributed network switch of claim 13, wherein the egress processor sends the notification message indicative of the metering result to the ingress processor.

16. A method of policing data packets in a distributed network switch, comprising:

receiving, at an ingress processor in a distributed network switch, from a transmitting device coupled to the distributed network switch, a notification message indicative of a metering result of metering a quantity of data packets in a flow of data packets passing via a metering device in an egress processor to a receiving device for a period of time, the egress processor configured to perform an egress processing operation in the distributed network switch; and buffering or dropping at least some data packets destined to be processed in the distributed network switch before completing an ingress processing operation at the ingress processor on the buffered or dropped data packets based on the notification message.

17. The method of claim 16, wherein the buffering or dropping of at least some of the data packets destined to be processed in the distributed network switch is performed before completion of one or more selected ingress processing operations at the ingress processor.

18. The method of claim 16, further comprising:

sending, at the egress processor, the notification message indicative of the metering result to the ingress processor.

* * * * *